US006687223B1

United States Patent
Sajadieh et al.

(12)

(10) Patent No.: US 6,687,223 B1
(45) Date of Patent: Feb. 3, 2004

(54) DELAY-LOCKED ADMISSION CONTROL SCHEME IN COMMUNICATIONS NETWORKS

(75) Inventors: Masoud Sajadieh, Holmdel, NJ (US); Mohsen Sarraf, Rumson, NJ (US); Kazem Anaraky Sohraby, Lincroft, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/480,487

(22) Filed: Jan. 11, 2000

(51) Int. Cl.[7] .............................................. H04L 12/26
(52) U.S. Cl. .................................... 370/230; 370/230.1
(58) Field of Search ................................. 370/230, 233, 370/234, 230.1, 252, 253, 439, 498, 458

(56) References Cited

U.S. PATENT DOCUMENTS 5,646,943 A * 7/1997 Elwalid ....................... 370/230
5,805,577 A * 9/1998 Jain et al. .................... 370/234

\* cited by examiner

Primary Examiner—Melvin Marcelo

(57) ABSTRACT

A connection admission control mechanism for packet, circuit, or hybrid packet and circuit networks whereby the signaling message (i.e., "query") delay in a control channel of a network switch is maintained (i.e., "locked") in a timed control interval at a desired level using feedback parameters relating to an estimated current amount of delay in the packet network switch during one or more previous timed control intervals, to guarantee or closely achieve a desired signaling message or query delay performance. The processing delay of the network is bound or "locked" at a desired delay performance level based on substantially real-time estimation or measurement of the current signaling message delays of queries or call control packet streams during one or more previous control intervals. Thus, connection processing is robust against variations in traffic intensity and/or processing capabilities of the switch, and a single QoS measure or specification can be applied to the network switch. Because of the resemblance to a phase locked loop (PLL) in hardware timing acquisition techniques, the technique is referred to herein as Delay-Locked Admission Control (DLAC). The control intervals may be adjusted based on the particular application. During each control interval, a predetermined maximum number of new queries are allowed into the processing fabric of the switch. In one embodiment, the maximum number of allowed during any one control interval is initialized at start-up to a desired value, e.g., to 1, to a randomly chosen integer, or chosen according to queuing theory estimates for the particular application and/or based on current conditions.

17 Claims, 4 Drawing Sheets

HIGH LEVEL FLOW DIAGRAM OF THE DLAC TECHNIQUE AND APPARATUS

HIGH LEVEL FLOW DIAGRAM OF THE DLAC TECHNIQUE AND APPARATUS

HIGH LEVEL FLOW DIAGRAM OF THE DLAC TECHNIQUE AND APPARATUS

A FILTERED VERSION OF INSTANTANEOUS VARIATION MEASUREMENT

DLAC OPERATES ON THE SIGNALING MESSAGES/QUERIES OF THE SYSTEM

DELAY-LOCKED ADMISSION CONTROL SCHEME IN COMMUNICATIONS NETWORKS

BACKGROUND OF THE INVENTION

1. Field of the Invention

This invention relates generally to communications networks. More particularly, it relates to a control scheme to improve the control of Quality-of-Service (QoS) parameters in a packet or circuit network, e.g., in a voice-over-IP network.

2. Background of Related Art

Quality-of-Service (QoS) is one of the most important factors in communications and switching equipment. An important measure of QoS, especially in switching systems, with real-time applications support, is the processing delay that signaling messages encounter. Average processing delays are an important measure, particularly in multimedia applications, as the switching equipment is required to handle a significant amount of real-time traffic, e.g., voice and/or video.

Real-time signals are delay-sensitive in that they suffer performance and QoS degradation in the case of excessive and/or uncontrolled switching delays at any particular time in the communications network. While a predictable and consistent time delay through a network can be accommodated and associated with a particular level of QoS, a variable and inconsistent time delay becomes difficult and inefficient from a network standpoint because the QoS will likely be rated at the level of the worst case delay in the variable delay environment. Conventional networks tend to suffer from an inconsistent service delay due to conventional admittance techniques such as packet queuing.

There is a need for a more efficient technique and apparatus to improve the inconsistency and variability in service delays in a switching network.

SUMMARY OF THE INVENTION

In accordance with the principles of the present invention, an admission technique comprises defining a length of a control interval. A delay of queries or messages processed by a network system during a first control interval is measured. A number of queries admitted to the system during a second control interval after the first control interval is maintained based on the measured delay to target a desired delay for the communications system.

A query admission control loop comprises a query delay measurement module to measure the delay through the switching network system during a first control interval. An error calculation module determines a delay difference between the measured queries delay and a target delay. A controller adjusts a number of queries allowed into the queries network system during a second control interval from a number of queries allowed into the packet network during the first control interval based on the determined delay difference.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1A:
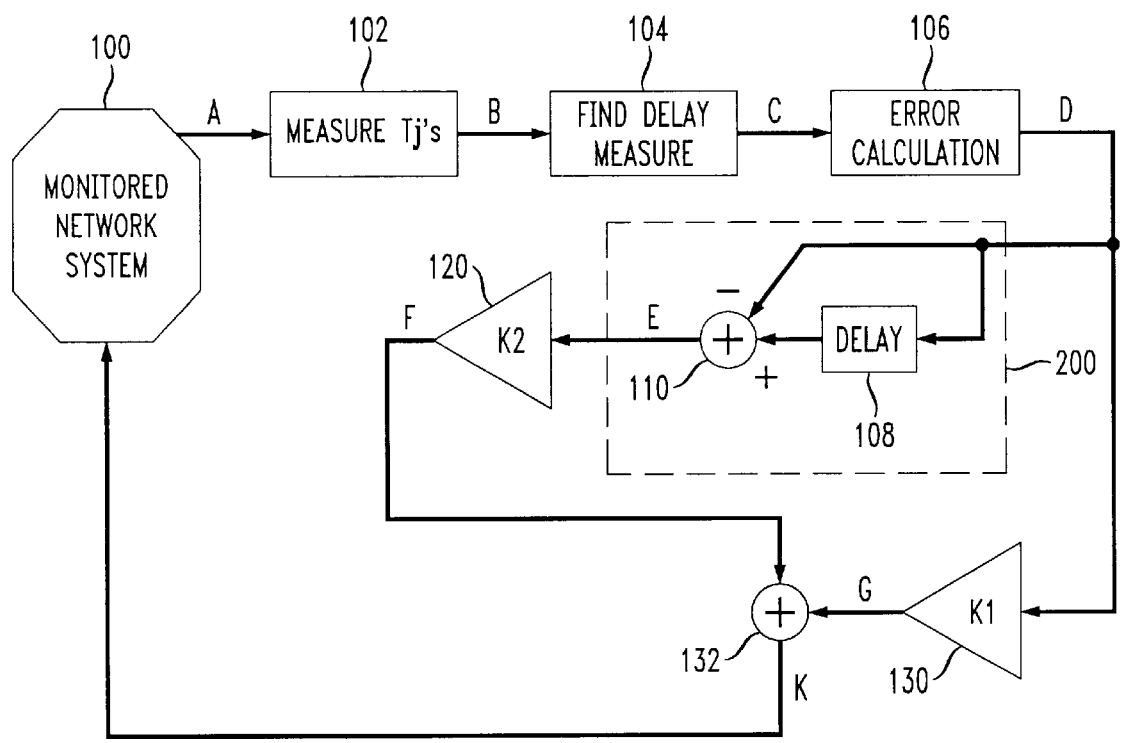
FIG. 1A is a block diagram depicting the normal operation of a delay-locked admission control (DLAC) technique and apparatus, in accordance with the principles of the present invention.

The present invention provides an admission control mechanism for communications networks whereby the delay in the network switch is maintained (i.e., "locked") at a desired level using feedback parameters relating to an estimated current amount of delay in the network switch. In accordance with the principles of the present invention, only an adaptable number of new data signals (e.g., new queries or new telephone call requests) in a given time interval are allowed to enter the network switch during any particular time interval, to guarantee or closely achieve a desired delay performance.

In particular, in accordance with the principles of the present invention, an admission scheme is provided which bounds the processing delay of the network to a desired level based on substantially real-time estimation or measurement of the current delays. Importantly, the number of queries (i.e., series of related packets) admitted in any particular time interval is self-adapting, in the sense that, once a delay threshold is set, it will automatically adjust the admission of new queries in a subsequent control interval based on delays measured for queries in one or more previous control intervals, to maintain a delay performance as close to the target as possible.

In the given example, a "query" is a signaling message. For example, a query might contain control information such as is required for telephone call establishment or ATM type requests. The time delay is measured by the amount of time the particular network switch takes to process a given query from acceptance to disposal of a given query, as determined, e.g., from the difference between time stamps added to the given query upon acceptance and again upon final disposition.

The automatic delay adjustment feature in accordance with the principles of the present invention provides a control mechanism which is robust against variations in the traffic intensity and/or the processing capabilities of the switch. Another advantage of the delay-locked admission control is that in systems comprising heterogeneous processing elements, a single QoS measure or specification can be applied to the entire system regardless of the characteristics of the processing elements.

Due to these features, the function of the present invention resembles that of a phase locked loop (PLL) in hardware timing acquisition techniques. Thus, the technique is referred to herein as Delay-Locked Admission Control (DLAC).

In accordance with the DLAC technique, time is divided into time slots called control intervals. Each control interval is 'delta' time units long. The length of each control interval is preferably chosen in accordance with the needs of the particular application.

During each control interval, a predetermined maximum number of queries (i.e., associated packet streams) are allowed into the processing fabric of the switch. At start up, the maximum number of queries allowed during any one control interval is initialized to a desired value, e.g., to 1, to a randomly chosen integer, or chosen according to queuing theory estimates for the particular application and/or based on current conditions.

The initial value of the maximum number of queries allowed during any one control interval influences the time it takes for the DLAC process to settle into steady state operation from its initial transient state. A higher initial value will speed up the transition to steady state, but can cause oscillatory behavior around the stable admission point. On the other hand, choosing a lower initial value (e.g., $N_{init}=1$), results in the most conservative approach, in which case queries are allowed slowly without overshooting the delay requirements. The specific initial value of the maximum number of queries allowed during any one control interval should be set in accordance with the needs of the particular application.

FIG. 1A is a block diagram depicting the normal operation of the delay-locked admission control (DLAC) technique and apparatus, in accordance with the principles of the present invention.

In particular, in FIG. 1A, a communications network system 100 such as a gateway into an Internet in a voice-over-IP system is monitored for control by the DLAC technique and apparatus in accordance with the principles of the present invention. The DLAC technique and apparatus may be comprised within the network system 100, and/or external to the network system 100. Moreover, some or all modules 102, 104, 106, 200, 120, 130 and 132 are implemented within program code of one or more suitable processors (e.g., microcontrollers, microprocessors, and/or digital signal processors (DSPs)).

A query delay measurement module 102 measures or determines a delay by determining a difference between time stamps associated with particular message streams (e.g., queries). While the disclosed embodiment measures a delay between a time stamp associated with query acceptance and query disposition by the system 100, the principles of the present invention relate equally to measurement of delays between any two events.

A find delay measure module 104 determines an average delay over a given one or more control intervals.

An error calculation module 106 determines a deviation of the average delay with respect to a target or desired delay.

An error driver module 130 provides a '$1^{st}$-order' type control of the delay-locked query admissions based on a magnitude and sign of the delay error determined by the error calculation module 106.

A second feedback path 200 including a $2^{nd}$ order type control of the delay-locked query admissions includes a delay 108 for delaying the use of the error determined by the error calculation module 106, and a summation module 110, followed by another 'driver' 120. The $2^{nd}$ order nature of the feedback path 200 provides a derivative of the errors accumulated over a number of control intervals to develop a gradient of errors. Thus, if the errors over a series of control intervals present a growing or increasing error trend, the information at E instructs the information driver 120 to drop a relevant number of new queries or calls in the next control interval. If, on the other hand, the errors over a series of control intervals present a decreasing error trend, the information at point E instructs the information driver 120 to accept a relevant number more new queries or calls in the next control interval.

The output of the summing module 132 relates to the final feedback control information for the query acceptance during the current control interval. In FIG. 1A, the output of the summing module 132 relates to a delta value corresponding to an adjustment value only of increasing or decreasing the acceptance of new queries into the monitored system 100.

Figure 1B:
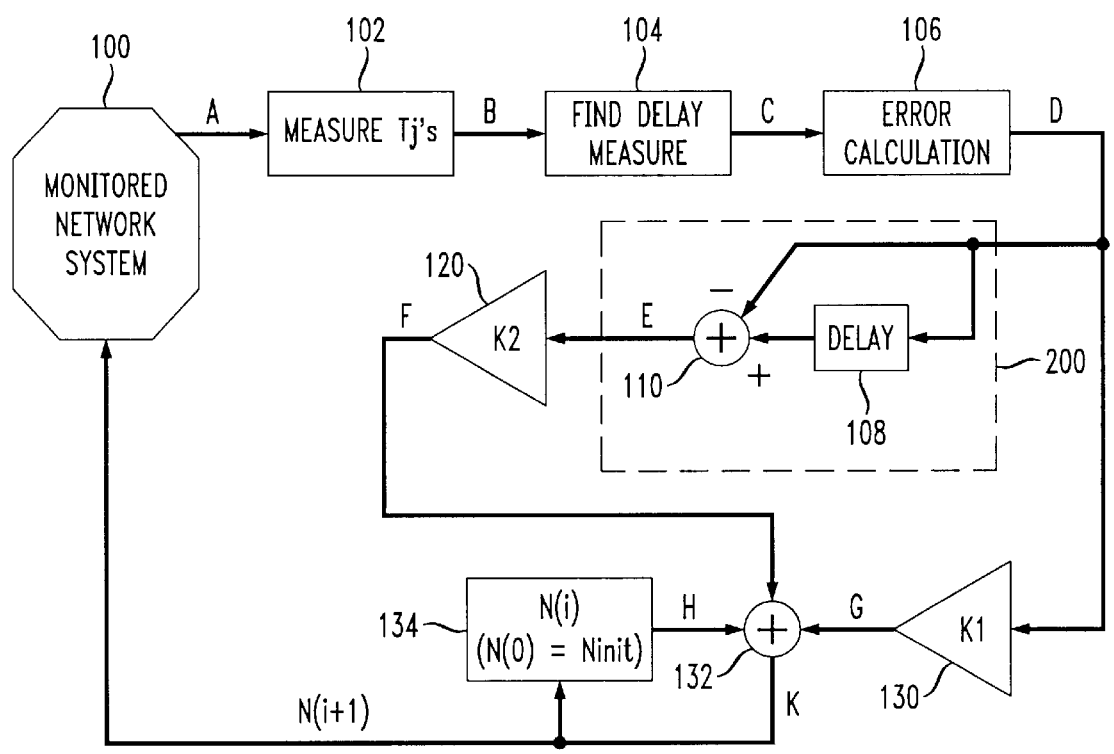
FIG. 1B is a block diagram depicting the normal operation of another embodiment of a delay-locked admission control (DLAC) technique and apparatus, in accordance with the principles of the present invention.

FIG. 1B is a block diagram depicting the normal operation of another embodiment of a delay-locked admission control (DLAC) technique and apparatus, in accordance with the principles of the present invention.

In FIG. 1B, the output of the summing module 132 relates to an absolute number of new queries to accept during the current control interval. To accomplish this, a number of queries module 134 provides a conversion from a delta or differential error value provided from the summer module 132 to an absolute number of queries to accept into the monitored system 100 in the current control interval. Thus, the summer module 132 determines whether or not to add or drop a certain number of new queries (or calls, or queries, or associated packet streams) in a given control interval.

The use of the number of queries module 134 also allows the introduction of a default or initialization value for the absolute number of queries to accept into the first control interval, e.g., Ninit. Ninit may equal 0, 1 or any other desired number of queries to start the feedback process. Of course, the further the initialization value from the ultimate range of the steady state number of queries admitted, the larger the overshoots and volatility of the delays in the system until a steady state condition is achieved.

For instance, at the beginning of interval i, a maximum of $N_i$ will be allowed into the switch. Per query delay is then measured, as denoted at point B in FIG. 1A. As there may be less than $N_i$ arrivals during interval i, note that $N_i$ is merely the maximum number allowed. The DLAC technique and apparatus will adjust the number of incoming queries in the next control interval according to one of the following control strategies.

A. Control in the Average-Sense

After measuring individual packet delays, $t_j$, j=1, . . . , $q_i$, in the ith interval, the interval average delay is given by the following expression where $q_i$ is the actual number of queries admitted.

$$\overline{T}_i = \frac{\sum t_j}{q_i}$$

This is then steered toward the target delay threshold T.

If desired, the influence of sports or 'outliers', i.e., extreme delay values which may have been the result of sporadic system malfunctions, can be removed. Any suitable outlier removal technique may be employed, e.g., screening out individual delays outside a given range around the long-term trend of system delays. To achieve this, long-term delay average and variance of the delays should be monitored.

B. Control in the Distribution State

During the ith interval, the DLAC technique and apparatus obtains the proportion, $P_i$, of the measured delay values below a given threshold, $T_p$, according to the equation:

$$P_i = \frac{\sum I_j}{q_i}$$

where $I_j$ is 1 if the $j^{th}$ delay is smaller than $T_p$, and 0 otherwise. It is then pushed to converge toward the percentile target of P. This is the preferred control approach if, for example, the design requirements call for the delay encountered by any query to be less than the threshold with, say, 90% confidence.

C. Control in the Maximum-Sense

As opposed to the average-sense control in which extreme measured delays are given zero weight in the control scenario by removing outliers, it is possible to activate the control mechanism only when the maximum observed delay, $T_{max}$, is greater than a pre-defined threshold, $T_t$. This case corresponds to a worst case control mode.

Depending on the control option, either of the above delay-based metrics is measured over the control interval. The error calculation module in FIG. 1A receives this metric at point C, and calculates the deviation from the desired target:

$$\text{error}(i) = d(M_{obs}, \overset{+}{M})$$

where $M_{obs}$ is the observed metrics of the ith interval, and $\overset{+}{M}$ is the desired point of operation. The reference d refers to any distance measure which preserves the sign of the error value such as $l_1$ or $l_3$.

These two quantities are dependent on the adopted control mode as follows.

For the Average-Sense control:

$$M_{obs} = \bar{T}_i, \overset{+}{M} = \overset{+}{T}$$

For the Distribution State control:

$$M_{obs} = P_i, \overset{+}{M} = P$$

For the Maximum-Sense control:

$$M_{obs} = T_{max}, \overset{+}{M} = T_t$$

The per control interval error at point D in FIG. 1A is then used to drive the delay-locked loop sub-system as denoted by the K1 and K2 correction factors shown in FIG. 1A.

The main portion of the DLAC technique and apparatus resembles a second order phased locked loop (PLL) in communications systems. In particular, the DLAC technique and apparatus keeps track of target performance by acting upon the per control interval average deviation measure provided at point D in FIG. 1A. Based on the information received at point D, the DLAC technique and apparatus correspondingly adjusts the number of queries allowed in the following control interval.

For instance, if $$\overset{+}{M}$$

is much smaller than $M_{obs}$, the correction factor may result in adding one or more to $N_i$ in the subsequent control interval. On the other hand, if it is larger, it may subtract a desired number of queries from $N_i$. Finally, if the difference is within a predetermined range, the number of queries admitted over the next control interval, $N_{i+1}$, may remain the same. This correction stage is represented in FIG. 1A by the K1 correction stage.

The second correction stage, K2 shown in FIG. 1A, takes into account variations in the system characteristics such as processing speed or traffic intensity. As a result, to obtain $N_{i+1}$, both correction factors K1 (point G) and K2 (point F) will both be added to $N_i$.

As a result, only the maximum number of queries will be allowed in during the control interval i+1. At this stage, the DLAC technique and apparatus either adds a predetermined number, subtracts a predetermined number, or makes no change to the number of queries admitted per control interval to maintain the desired QoS.

If desired, the second correction factor K2 may be disengaged or eliminated (e.g., by setting the correction factor K2 to zero for all cases). This results in a first order rather than a second order delay-locked loop. In this case, the DLAC technique and apparatus simply responds to instantaneous variations, and may exhibit oscillations around the stable point.

Figure 2:
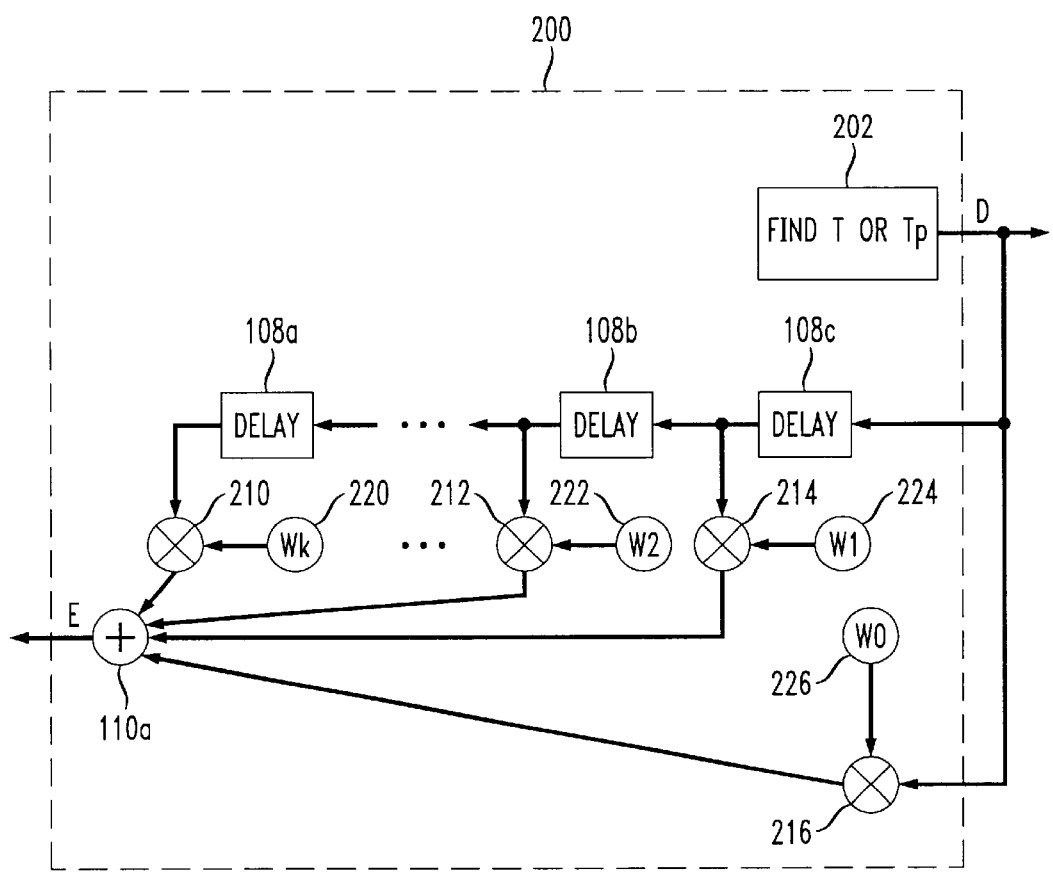
FIG. 2 shows a possible extension of the long-term memory of the delay estimate at point E in FIG. 1A by passing the measured error at point D in FIG. 1A through a longer tapped-delay line having different weights at each tap, in accordance with another embodiment of the present invention.

FIG. 2 shows the possible extension of the long-term. memory of the delay estimate at point E in FIG. 1A by passing the measured error at point D in FIG. 1A through a longer tapped-delay line having different weights at each tap, in accordance with the principles of the present invention.

In particular, in FIG. 2, FIG. 2 shows a finite impulse response (FIR) type implementation of a $2^{nd}$ order loop, to smooth or filter the error calculations over a number of control intervals.

Note that setting w=1 and w=−1, and the rest of the weights to zero in FIG. 2, results in the structure shown in FIG. 1A between points C and E.

Although the long-term memory of the estimate at point E in FIG. 1A may be extended as shown in FIG. 2, such an elaborate scheme is usually unnecessary for a particular application.

Moreover, the particular use of a tapped-delay line structure for filtering the instantaneous measurements as shown in FIG. 2 is by way of example only. In this regard, the principles of the present invention relate equally to the use of any other filtering structure. The structure shown in FIG. 1A is merely a simplest case which can be used in practice with minimal complexity.

Refinements can be applied to the DLAC technique and apparatus in accordance with the principles of the present invention to tune the length of the control interval. For instance, based on the needs of the particular application, the overall performance can be controlled more effectively by adjusting the length of the control interval and/or by adjusting N, the number of packets allowed in the switch per control interval. Such refinements are particularly useful in applications where packet traffic is substantially non-uniform.

Determination of the length of the control interval may become necessary in extreme (and possibly rare) situations where $N_i$ is very small, i.e., very few queries are allowed per control interval, yet the delay is longer than the preset limit. In this case, the length of the control interval is preferably increased. The actual value of $N_t$ and its relationship to the length of the control interval are design parameters which may not necessarily be determined (e.g., in the case of a constant length control interval).

In accordance with the principles of the present invention, if it is observed that a substantial number of queries per control interval are being blocked, the length of the control interval should be reduced, to provide the desired delay-locked admission to satisfy the required QoS parameters.

The specific value of particular thresholds are design parameters to be determined based on a particular application.

Note that while the disclosed embodiments relate to the delay-locked admission in a control channel (e.g., a signaling system No. 7 (SS7)) of a voice-over-IP system, the principles relate equally to packet systems such as ATM in general, whether telecommunications packet switching, the Internet in general, and/or voice-over-IP applications.

Figure 3:
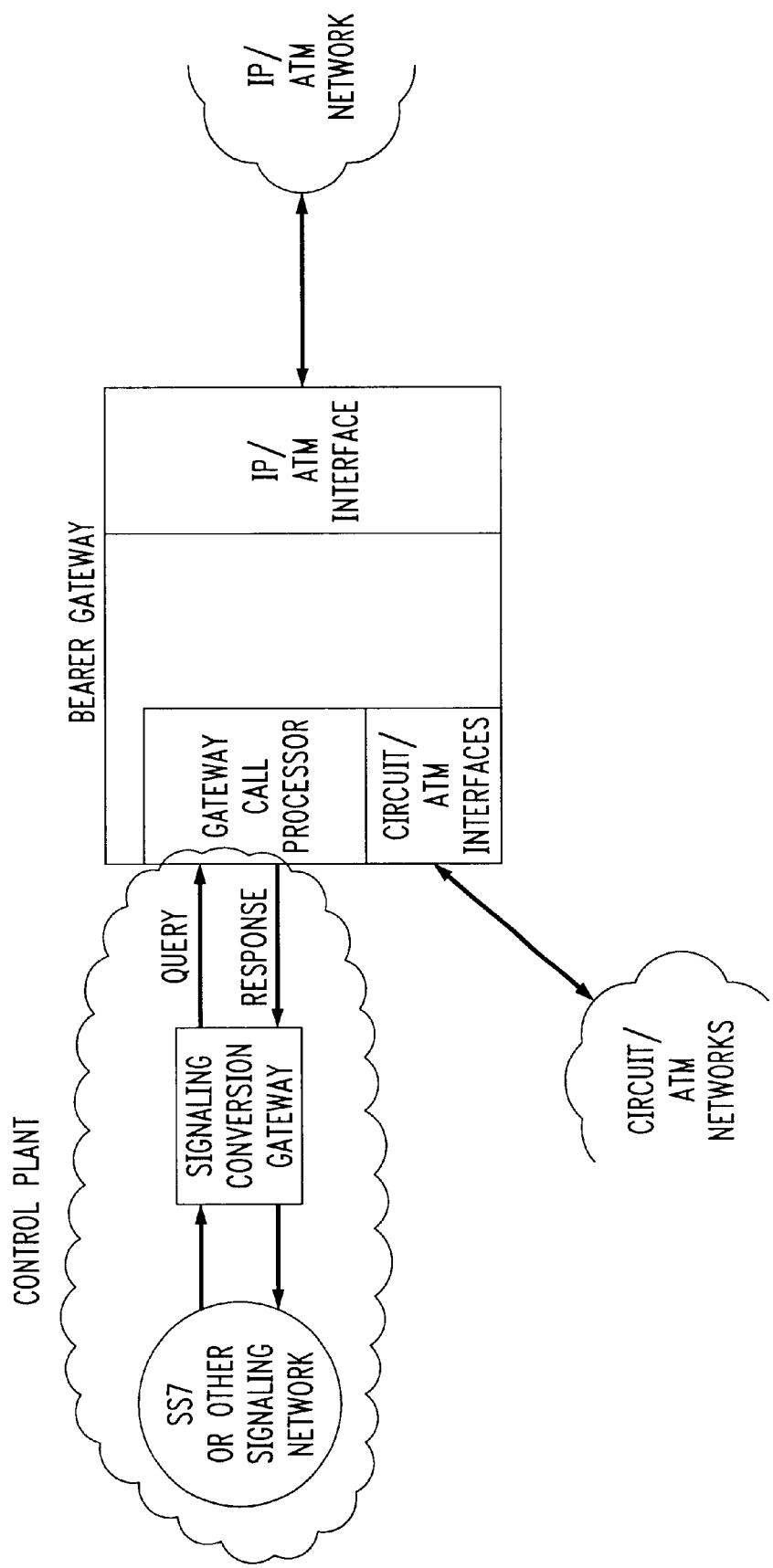
FIG. 3 shows an example network system including a circuit to circuit, circuit to Internet Protocol (IP), or circuit/IP to ATM connectivity, in accordance with the principles of the present invention.

For instance, FIG. 3 shows an example network system including a circuit to circuit, circuit to Internet Protocol (IP), or circuit to ATM/IP connectivity, in accordance with the principles of the present invention.

In particular, in FIG. 3, the domain of applicability of the principles of the present invention relate generally to the "control plant" portion designated in FIG. 3 where connection/control signals and messages are exchanged.

While the invention has been described with reference to the exemplary embodiments thereof, those skilled in the art will be able to make various modifications to the described embodiments of the invention without departing from the true spirit and scope of the invention.

What is claimed:

1. A connection admission technique comprising:
defining a length of a control interval;
measuring a delay of queries processed by a network system during a first control interval;
adjusting a number of queries admitted to said network system during a second control interval after said first control interval based on said measured delay to target a desired delay for said network system; and
basing a Quality-of-Service of said network system on said desired delay.

2. A connection admission technique comprising:
defining a length of a control interval;
measuring a delay of queries processed by a network system during a first control interval;
adjusting a number of queries admitted to said network system during a second control interval after said first control interval based on said measured delay to target a desired delay for said network system; and
adding hysteresis to said adjustment of said number of queries such that said number of queries is maintained unless said measured delay of queries differs significantly from a target delay.

3. The connection admission technique according to claim 2, wherein said adjusting said number of queries comprises:
increasing said number of queries admitted to said network system during said second control interval if said measured delay of queries is below a desired level; and
decreasing said number of queries admitted to said network system during said second control interval if said measured delay of queries is above a desired level.

4. A connection admission technique according to claim 2, wherein said network system comprises one of:
a circuit switch;
a packet switch; and
a hybrid packet and circuit switch.

5. A connection admission technique, comprising:
defining a length of a control interval;
measuring a delay of queries processed by a network system during a first control interval; and
adjusting a number of queries admitted to said network system during a second control interval after said first control interval based on said measured delay to target a desired delay for said network system;
said measuring being an estimate for a current interval based on a sampling of a delay of a sub-plurality of queries in a preceding control interval.

6. A connection admission technique comprising:
defining a length of a control interval;
measuring a delay of queries processed by a network system during a first control interval;
adjusting a number of queries admitted to said network system during a second control interval after said first control interval based on said measured delay to target a desired delay for said network system; and
delaying an adjustment of said number of queries based on said measured delay of queries during said first control interval for use a plurality of control intervals later.

7. A connection admission module comprising:
means for defining a length of a control interval;
means for measuring a delay of queries processed by a packet network system during a first control interval;
means for adjusting a number of connections admitted to said network system during a second control interval after said first control interval based on said measured delay to target a desired delay for said network system; and
means for basing a Quality-of-Service of said network system on said desired delay.

8. A connection admission module comprising:
means for defining a length of a control interval;
means for measuring a delay of queries processed by a packet network system during a first control interval;
means for adjusting a number of connections admitted to said network system during a second control interval after said first control interval based on said measured delay to target a desired delay for said network system; and
hysteresis means in said means for adjusting to maintain said number of connections unless said measured delay differs significantly from a target delay.

9. The connection admission module according to claim 8, wherein said means for adjusting said number of connections comprises:
means for increasing said number of connections admitted to said network system during said second control interval if said measured delay of queries is below a desired level; and
means for decreasing said number of connections admitted to said network system during said second control interval if said measured delay of queries is above a desired level.

10. The packet admission module according to claim 8, wherein said network system comprises one of:
a circuit switch;
a packet switch; and
a hybrid packet and circuit switch.

11. A connection admission module, comprising:
means for defining a length of a control interval;
means for measuring a delay of queries processed by a packet network system during a first control interval; and
means for adjusting a number of connections admitted to said network system during a second control interval after said first control interval based on said measured delay to target a desired delay for said network system;
wherein said means for measuring determines an estimated query delay based on a sampling of a delay of a sub-plurality of queries in a preceding control interval.

12. A connection admission module comprising:

means for defining a length of a control interval;

means for measuring a delay of queries processed by a packet network system during a first control interval;

means for adjusting a number of connections admitted to said network system during a second control interval after said first control interval based on said measured delay to target a desired delay for said network system; and means for delaying an adjustment of said number of connections based on said measured delay of queries during said first control interval for use a plurality of control intervals later.

13. A connection admission control loop, comprising:

a query delay measurement module to measure a query delay through a network system during a first control interval;

an error calculation module to determine a delay difference between said measured query delay and a target query delay; and a controller to adjust a number of connections allowed into said network system during a second control interval from a number of connections allowed into said network system during said first control interval based on said determined delay difference.

14. The connection admission control loop according to claim 13, wherein:

at least one control interval intervenes between said first control interval and said second control interval.

15. The connection admission control loop according to claim 13, wherein:

said controller implements hysteresis such that said number of connections allowed into said network system is adjusted if said measured query delay differs significantly from said target query delay.

16. A connection admission control loop, comprising:

a query delay measurement module to measure a query delay through a network system during a first control interval;

an error calculation module to determine a delay difference between said measured query delay and a target query delay; and a controller to adjust a number of connections allowed into said network system during a second control interval from a number of connections allowed into said network system during said first control interval based on said determined delay difference;

said controller adjusting said number of connections allowed into said network system based on a delay difference determined from a plurality of previous control intervals.

17. The connection admission control loop according to claim 16, wherein:

said delay difference is an average delay difference over said plurality of previous control intervals.

* * * * *